United States Patent Office 3,597,365
Patented Aug. 3, 1971

3,597,365
PHOSPHOR
Harold Francis Ward, London, England, assignor to British Lighting Industries Limited, London, England
Filed Feb. 28, 1968, Ser. No. 709,064
Claims priority, application Great Britain, May 10, 1967, 21,676/67
Int. Cl. C09k 1/04; C22b 59/00
U.S. Cl. 252—301.4
13 Claims

ABSTRACT OF THE DISCLOSURE

A phosphor is produced by heating together trivalent cerium oxide and aluminium oxide to produce cerous aluminium oxide having the $\beta$-alumina crystal structure. For the production of a cerous manganese aluminium oxide phosphor, divalent manganese oxide may be included in the initial mixture or may be heated in admixture with the cerous aluminium oxide. In all cases any one or more of the oxides may be replaced at least partially by a compound which yields the oxide under the heating conditions.

---

This invention relates to phosphors and provides a phosphor consisting of a compound of trivalent cerium oxide and aluminium oxide with or without divalent manganese oxide and having the $\beta$-alumina crystal structure as determined by X-ray analysis.

The molecular ratio of trivalent cerium oxide to aluminium oxide in the preferred cerium aluminium oxide phosphor according to the invention is from 1:8 to 1:13, most advantageously 1:10.5 to 1:12.5. With a molecular ratio outside the 1:8 to 1:13 range the compound is not wholly of the $\beta$-alumina structure and hence it fluoresces less brightly. For the same reason the preferred cerium manganese aluminium oxide phosphors the molecular ratio (trivalent cerium oxide $+\frac{1}{3}$ divalent manganese oxide): aluminium oxide is within the same limits and in addition the trivalent cerium oxide:divalent manganese oxide molecular ratio is preferably from 1:0.125 to 1:1.25, most advantageously from 1:0.25 to 1:1. The preferred phosphors may thus be expressed.

$$xCe_2O_3.yAl_2O_3$$

where $x:y$ is from 1:8 to 1:13 and preferably from 1:10.5 to 1:12.5 and $$xCe_2O_3.zMnO.yAl_2O_3$$

where $(x+\frac{1}{3}z):y$ is from 1:8 to 1:13, preferably from 1:10.5 to 1:12.5 and where $x:z$ is preferably from 1:0.125 to 1:1.25 and most advantageously from 1:0.25 to 1:1.

In forming the phosphors according to the invention the constituent oxides may be mixed and heated together, e.g. in a reducing or inert atmosphere at 1200–1700° C., so as to form the oxide compound having the required $\beta$-alumina structure. Instead of or in addition to the oxides compounds which yield the oxides under the firing conditions may be employed. The phosphor obtained should be cooled under reducing or inert condition to maintain the trivalent cerium or cerous state. Firing at above 1680° C. tends to give a hard phosphor.

In preparing the cerium manganese aluminium oxide phosphor it is preferred to first form a cerium aluminium oxide phosphor, e.g. by firing the mixture in a reducing or inert atmosphere at 1580° C., and then to mix this with divalent manganese oxide or a divalent manganese oxide-forming compound and refire the mixture, e.g. in a reducing or inert atmosphere at 1200 to 1400° C. The product should again be cooled under conditions such as to maintain the cerous state.

A suitable reducing atmosphere for the firing steps is hydrogen; only sufficient gas flow to maintain the cerous state is necessary.

Figure 1:
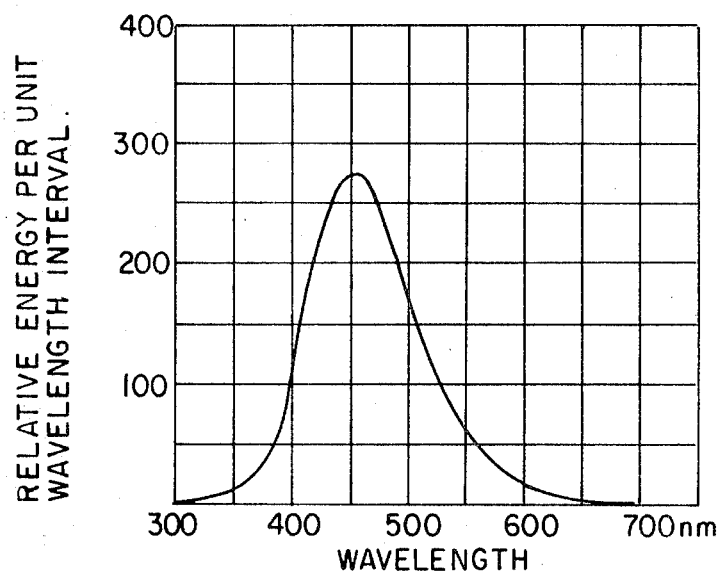

The preferred cerium aluminium oxide phosphors according to the invention have a bright blue emission from 3000 A. to 6000 A. peaking at 4600 A. under 2537 A. U.V. radiation. FIG. 1 of the accompanying drawings gives the spectral energy distributions of such a phosphor when used in a fluorescent lamp.

The presence of divalent manganese oxide suppresses the 4600 A. peak and gives a second peak at 5200 A. and with increasing divalent manganese oxide content the phosphor emission goes from blue-blue-green and green, emitting between 4800 A. to 6000 A. and peaking at 5200 A.

Figure 2:
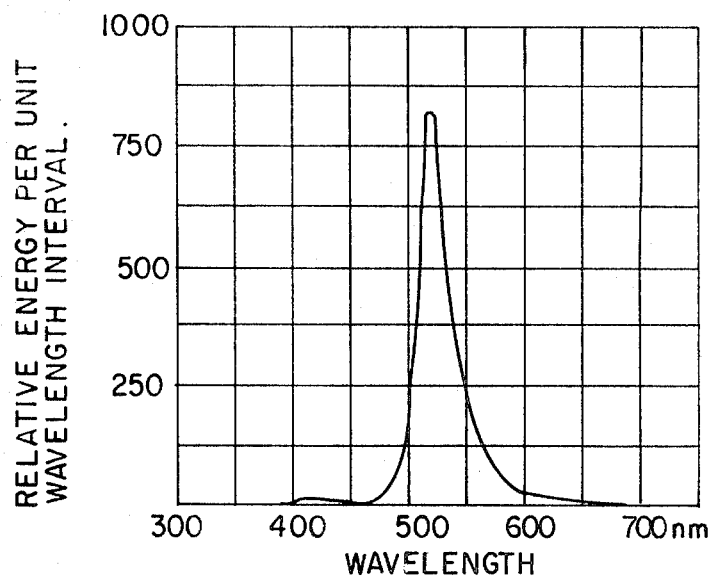

FIG. 2 of the accompanying drawings gives the spectral energy distribution of the green phosphor when used in a fluorescent lamp.

Phosphors according to the invention may also be excited by 3650 A. radiation and by cathode rays and have good lumen output and lumen maintenance.

The following are specific examples of the preparation of phosphors according to the invention:

EXAMPLE 1

|  | Grams |
| --- | --- |
| $Al_2O_3$ (95.5% $Al_2O_3$ content) | 24.5 |
| Cerous oxalate | 14.0 |

These constituents are thoroughly blended and the mixture is fired (in combustion boats holding 9–12 g.) in hydrogen at 1650° C. for 1¼ hours. The fired blend is cooled in hydrogen or hydrogen/nitrogen mixture to room temperature. The resultant phosphor is a white powder giving a bright blue emission under 2537 A. and 3650 A. radiation.

EXAMPLE 2

|  | Grams |
| --- | --- |
| $Al_2O_3$ (95.5% $Al_2O_3$ content) | 32.0 |
| Cerous oxalate | 14.0 |

The above constituents are thoroughly blended and the mixture is treated as in Example 1. To the resulting product is added:

Manganese carbonate (42.7% Mn content)—5.5%

The mixture is thoroughly blended and fired in reducing conditions at 1350° C. for 1½ hours and cooled in reducing or inert atmosphere.

The resultant phosphor is a white powder giving a bright green emission under 2537 A. and 3650 A. U.V. radiation: its lumen output and maintenance in a 4 ft. 40 w. fluorescent lamp was found to be as follows:

|  | 0 hours | 100 hours | 500 hours |
| --- | --- | --- | --- |
| Average l./w 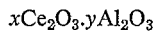 | 77.0 | 72.0 | 68.3 |
| Average maintenance, percent  |  | 93.5 | 89 |

In comparison the lumen maintenance of a zinc silicate control was 91.4% after 100 hrs. and 87% after 500 hrs.

EXAMPLE 3

|  | Grams |
| --- | --- |
| $Al_2O_3$ (95.5% $Al_2O_3$ content) | 28.0 |
| Cerous oxalate | 14.0 |

The constituents are thoroughly blended and the mixture is fired as in Example 1. To the fired mixture is added:

Manganese carbonate (42.7% Mn)—3%

The mixture is thoroughly blended and fired in reducing conditions at 1350° C. for 1½ hours, and cooled to room temperature under the same conditions.

The resultant phosphur is a white powder giving a bright blue green emission under 2537 A. and 3650 A. U.V. radiation.

In all the above preparations the ingredients used were of the highest commercially available purity.

What is claimed is:

1. A phosphor consisting of a compound of trivalent cerium oxide, divalent manganese oxide and aluminium oxide and having the β-alumina crystal structure.

2. A phosphor according to claim 1 having the formula:

$$xCe_2O_3 \cdot zMnO \cdot yAl_2O_3$$

where $(x+\frac{1}{3}z):y$ is from 1:8 to 1:13.

3. A phosphor according to claim 2 wherein $(x+\frac{1}{3}z):y$ is from 1:10.5 to 1:12.5.

4. A phosphor according to claim 2 wherein $x:z$ is from 1:0.125 to 1:1.25.

5. A phosphor according to claim 4 wherein $x:z$ is from 1:0.25 to 1:1.

6. A method of preparing a phosphor comprising: forming a mixture of trivalent cerium oxide and aluminum oxide, the molar ratio of trivalent cerium oxide to aluminum oxide in the mixture being between about 1:8 to 1:13; heating said mixture in an inert or reducing atmosphere at a temperature of from 1200 to 1700° C. to produce a cerous aluminum oxide phosphor having the β-alumina crystal structure; mixing the cerous aluminium oxide produced with divalent manganese oxide and heating the resulting mixture in a reducing or inert atmosphere to produce a cerous manganese aluminium oxide phosphor having the β-alumina crystal structure.

7. A method according to claim 6 wherein the mixture of divalent manganese oxide with cerous aluminium oxide is heated in a reducing or inert atmosphere at a temperature of from 1200 to 1400° C.

8. A modification of the method according to claim 6 wherein at least one of the oxides is at least partially replaced by a compound yielding the corresponding oxide under the heating conditions.

9. A method according to claim 8 wherein cerous oxide is at least partially replaced by cerous oxalate.

10. A method of preparing a phosphor comprising: forming a mixture of trivalent cerium oxide, divalent manganese oxide and aluminum oxide, the molar ratio of (cerium oxide+⅓ divalent manganese oxide): aluminum oxide being 1:8 to 1:13; heating said mixture in an inert or reducing atmosphere at a temperature from 1200 to 1700° C. to produce a phosphor having the β-alumina crystal structure.

11. A method according to claim 10 wherein the molecular ratio (trivalent cerium oxide+⅓ divalent manganese oxide): aluminium oxide in the mixture is from 1:10.5 to 1:12.5.

12. A method according to claim 11 wherein the molecular ratio trivalent cerium oxide to divalent manganese oxide in the mixture is from 1:0.125 to 1:1.25.

13. A method according to claim 12 wherein the molecular ratio of trivalent cerium oxide to divalent manganese oxide in the mixture is from 1:0.25 to 1:1.

References Cited

UNITED STATES PATENTS 3,294,701  12/1966  Vogel et al. _____ 23—52X
3,420,780  1/1969  Forrat et al. _____ 23—52X

OTHER REFERENCES

Leonov et al.: "Chemical Abstracts," vol. 58, 1963, p. 7601d.

Leonov et al.: "Chemical Abstracts," vol. 65, 1966, pp. 3314–3315.

HERBERT T. CARTER, Primary Examiner

U.S. Cl. X.R.

23—21, 52